(12) United States Patent
Sareen et al.

(10) Patent No.: US 12,316,221 B2
(45) Date of Patent: May 27, 2025

(54) SELECTIVE STOPBAND AVOIDANCE IN SWITCHING CONVERTER CONTROLLER

(71) Applicant: TEXAS INSTRUMENTS INCORPORATED, Dallas, TX (US)

(72) Inventors: Puneet Sareen, Freising (DE); Michael Känner, Munich (DE); Christian Harder, Freising (DE); Narayanan Seetharaman, Unterschliessheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/374,325

(22) Filed: Sep. 28, 2023

(65) Prior Publication Data

US 2024/0022169 A1    Jan. 18, 2024

Related U.S. Application Data

(63) Continuation of application No. 17/537,802, filed on Nov. 30, 2021, now Pat. No. 11,863,069.

(51) Int. Cl.
*H02M 3/157*    (2006.01)
*H02M 1/00*    (2006.01)

(52) U.S. Cl.
CPC ......... *H02M 3/157* (2013.01); *H02M 1/0041* (2021.05)

(58) Field of Classification Search
CPC .. H02M 3/153; H02M 3/1563; H02M 3/1566; H02M 3/157; H02M 3/158; H02M 3/1582
See application file for complete search history.

(56) References Cited

U.S. PATENT DOCUMENTS

| | | | |
|---|---|---|---|
| 8,766,616 B2 * | 7/2014 | Oyama | H02M 3/1588 327/87 |
| 2010/0072968 A1 * | 3/2010 | Bianco | H02M 3/156 323/284 |
| 2019/0238054 A1 | 8/2019 | Flaibani et al. | |
| 2020/0119641 A1 * | 4/2020 | Liang | H02M 3/157 |

* cited by examiner

*Primary Examiner* — Nguyen Tran
(74) *Attorney, Agent, or Firm* — Charles F. Koch; Frank D. Cimino

(57) ABSTRACT

A switching converter controller includes: a stopband controller having a stopband controller input and a stopband controller output, the stopband controller is configured to provide stopband information at the stopband controller output responsive to a reference signal; a pulse-frequency modulation (PFM) controller having a first PFM controller input, a second PFM controller input and a PFM controller output, the first PFM controller input configured to receive a feedback error signal, the second PFM controller input coupled to the stopband controller output, and the PFM controller configured to selectively adjust a clock signal at the PFM controller output based on the feedback error signal and the stopband information; and a driver circuit having a driver circuit input coupled to the PFM controller output and configured to receive the clock signal, and having a driver circuit output adapted to be coupled to a power stage switch.

16 Claims, 9 Drawing Sheets

SELECTIVE STOPBAND AVOIDANCE IN SWITCHING CONVERTER CONTROLLER

CROSS-REFERENCE TO RELATED APPLICATION

This application is a continuation of U.S. application Ser. No. 17/537,802 filed Nov. 30, 2021, which is hereby incorporated herein by reference in its entirety.

BACKGROUND

As new electronic devices are developed and integrated circuit (IC) technology advances, new IC products are commercialized. One example IC product is a switching converter, which provides an output voltage based on an input voltage. Switching converters include a controller and a power stage, and are used in various electronic device to regulate power to one or more loads.

Because switching converters use a clock to generate the output voltage from the input voltage, there is noise at the switching frequency which may cause interference to the other sensitive circuits. For example, the sensitive circuits may be supplied by the switching converter and/or are nearby the switching converter. In some scenarios, the noise is not acceptable to a given application. To manage noise issues, fixed-frequency switching converters may be used, where the switching frequency is selected to be far away from the sensitive frequencies. However, fixed-frequency switching converters have limited efficiency.

SUMMARY

In one example embodiment, a switching converter controller comprises a stopband controller having a stopband controller input and a stopband controller output, the stopband controller input is configured to receive a reference signal, and the stopband controller is configured to provide stopband information at the stopband controller output responsive to the reference signal. The switching converter controller also comprises a pulse-frequency modulation (PFM) controller having a first PFM controller input, a second PFM controller input and a PFM controller output, the first PFM controller input configured to receive a feedback error signal, the second PFM controller input coupled to the stopband controller output, and the PFM controller configured to selectively adjust a clock signal at the PFM controller output based on the feedback error signal and the stopband information. The switching converter controller also comprises a driver circuit having a driver circuit input and a driver circuit output, the driver circuit input coupled to the PFM controller output and configured to receive the clock signal, and the driver circuit output adapted to be coupled to a power stage switch.

In another example embodiment, a system comprises a switching converter controller having: a driver circuit; and a control loop coupled to driver circuit. The control loop is configured to: provide a clock signal to the driver circuit; and selectively adjust a frequency of the clock signal responsive to a stopband detection signal indicating a switching frequency of the switching converter controller is within a predetermined stopband.

DETAILED DESCRIPTION

Figure 1:
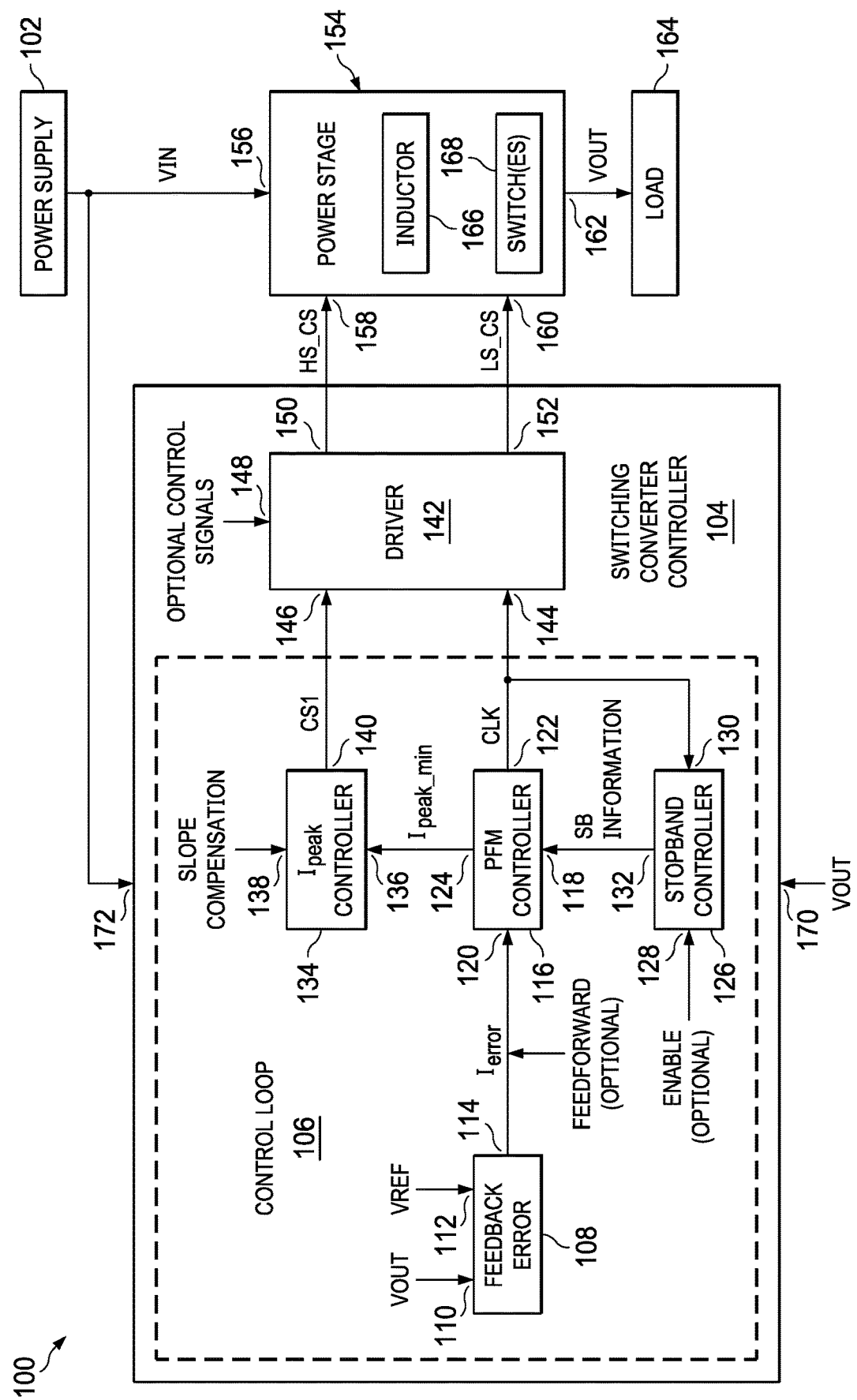
FIG. 1 is a block diagram of a system in accordance with an example embodiment.

Some example embodiments include a switching converter controller configured to selectively adjust its switching frequency to avoid one or more predetermined stopbands. As used herein, a "stopband" is a band of frequencies to be avoided. The same reference numbers (or other reference designators) are used in the drawings to designate the same or similar (structurally and/or functionally) features. FIG. 1 is a block diagram of a system 100 in accordance with an example embodiment. The system 100 represents any electrical device with a load 164, a power supply 102 (e.g., a battery or other direct-current (DC) power source), and power management circuitry including a power stage 154 and a switching converter controller 104. As shown, the power stage 154 includes: a power stage input 156; a first drive signal input 158; a second drive signal input 160; an inductor 166; switch(es) 168 having respective control terminals coupled to the first drive signal input 158 or the second drive signal input 160; and a power stage output 162. In different example embodiments, the topology (e.g., the arrangement of the inductor 166 and switch(es) 168) of the power stage 154 may vary. Example topologies for the power stage 154 include a boost converter topology, a buck converter topology, or a buck-boost converter topology. In a buck converter topology, VOUT at the power stage output 162 is less than the input voltage (VIN) provided to the power stage input 156 by the power supply 102. In a boost converter topology, VOUT is greater than VIN. In a buck-boost converter topology, VOUT may be greater than or less than VIN.

Relative to switchless power management options, the switching converter controller 104 and power stage 154 can more efficiently provide power from the power supply 102 to the load 164. However, some undesirable switching noise may be introduced to the load 164 and/or other components of the system 100. To reduce or avoid switching noise at one or more predetermined stopbands, the switching converter controller 104 includes a control loop 106 having a stopband controller 126. More specifically, in the example of FIG. 1, the control loop 106 includes: a feedback error circuit 108; a pulse-frequency modulation (PFM) controller 116 coupled to the feedback error circuit 108; a peak current ($I_{peak}$) controller 134 coupled to the PFM controller 116; and a stopband controller 126 coupled to the PFM controller 116.

In the example of FIG. 1, the stopband controller 126 includes a first stopband controller input 128 configured to receive an enable signal. The enable signal is optional. In some example embodiments, the enable signal is de-asserted when the control loop 106 performs PWM operations and/or other control options instead of PFM operations. The stopband controller 126 is configured to determine when the switching frequency of the switching converter controller 104 is within a predetermined stopband. For example, the switching frequency of the switching converter controller 104 may be determined by analyzing the frequency of a clock signal ("CLK") provided by the control loop 106 to a driver circuit 142 and a second stopband controller input 130 of the stopband controller 126. Other techniques for determining the frequency of the switching converter controller 104 are possible (e.g., analysis of the frequency of a high-side control signal "HS_CS" at a first driver circuit output 150, analysis of the frequency of a low-side control signal "LS_CS" at a second driver circuit output 152, or resulting switch activity). Once the switching frequency is obtained, the stopband controller 126 is configured to compare the switching frequency with one or more predetermined stopbands stored by the stopband controller 126. If the switching frequency of the switching converter controller 104 is within a predetermined stopband, the control loop 106 may adjust the frequency of CLK up or down to avoid the stopband based on stopband information (SB information) output from a stopband controller output 132 of the stopband controller 126.

In some example embodiments, stopband detection operations of the stopband controller 126 involve detecting that the switching frequency of the switching converter controller 104 is within a predetermined stopband for a number of stopband detection cycles. In different example embodiments, the stopband controller 126 may also: delay stopband detection operations for a time interval after a stopband is detected (to reduce the number of changes to the frequency of CLK due to stopband detection); adjust the direction of change to the frequency of CLK; and/or adjust the amount of change to the frequency of CLK. In some example embodiments, the control loop 106 may also account for a maximum peak current (related to the inductor 166 of the power stage 154), where the maximum peak current is based on a target efficiency for the switching converter controller 104 and/or a target VOUT ripple.

As desired, the stopband controller 126 may be selectively enabled or disabled. When enabled, the operations of the stopband controller 126 are used with the PFM controller 116. In some example embodiments, the PFM controller 116 only adjusts the frequency of CLK when feedback error is equal to or less than a threshold. In such example embodiments, if the feedback error is greater than the threshold, the frequency of CLK is maintained by the PFM controller 116 while the peak current controller 134 performs peak current modulation and provides a related control signal (CS1) to the driver circuit 142. In one example, CS1 is asserted responsive to a peak current being reached. With CS1 asserted, a high-side switch of the power stage 154 may be turned off (e.g., by de-asserting HS_CS). In different example embodiments, the switching converter controller 104 or control loop 106 may provide other control signals (e.g., PWM control signals, multi-phase control signals, zero crossing detection signals, and/or other control signals) to the driver circuit 142 via additional driver circuit inputs 148. In operation, the driver circuit is configured to provide drive signals (e.g., for a high-side switch and/or a low-side switch corresponding to the switch(es) 168) at the first driver circuit output 150 and the second driver circuit output 152.

In the example of FIG. 1, the operations of the switching converter controller 104 are based at least in part on VOUT and VIN. Accordingly, the switching converter controller 104 may include: a first input 170 configured to receive VOUT from the power stage output 162; and a second input 172 configured to receive VIN from the power supply 102 or the power stage input 156. The control loop 106 includes a feedback error circuit 108 having: a first feedback error circuit input 110 configured to receive VOUT (or a scaled version of VOUT); a second feedback error circuit input 112 configured to receive a reference voltage (VREF); and a feedback error circuit output 114. In operation, the feedback error circuit 108 is configured to provide a feedback error at the feedback error circuit output 114 responsive to VREF and VOUT. In some example embodiments, the feedback error is a current ($I_{error}$). As an option, $I_{error}$ is adjusted based on a feedforward signal, which may be a function of VOUT and/or VIN.

In the example of FIG. 1, $I_{error}$ is one of the inputs to the PFM controller 116. More specifically, the PFM controller 116 has a first PFM controller input 118, a second PFM controller input 120, a first PFM controller output 122, and a second PFM controller output 124. The first PFM controller input 118 is coupled to a stopband controller output 132 of the stopband controller 126. The second PFM controller input 120 is coupled to the feedback error circuit output 114 and is configured to receive $I_{error}$. The first PFM controller output 122 is coupled to a first driver circuit input 144 of the driver circuit 142 and is configured to provide CLK to the first driver circuit input 144. The second PFM controller output 124 is coupled to a first peak current controller input 136 of the peak current controller 134. In some example embodiments, the first peak current controller input 136 receives a minimum peak current ($I_{peak\_min}$) from the PFM controller 116. A second peak current controller input 138 of the peak current controller 134 is configured to receive a slope compensation signal or ramp. The peak current controller output 140 of the peak current controller 134 is configured to provide CS1 to a second driver circuit input 146 of the driver circuit 142. In some example embodiments, CS1 results from peak current modulation operations of the peak current controller. For example, peak current modulation may be performed by the peak current controller 134 based on $I_{peak\_min}$ and the slope compensation signal when feedback error (e.g., $I_{error}$) is greater than a threshold. When feedback error (e.g., $I_{error}$) is equal to or less than a threshold, the PFM controller 116 is configured to adjust the frequency of CLK based on the stopband information provided by the stopband controller 126.

Figure 2:
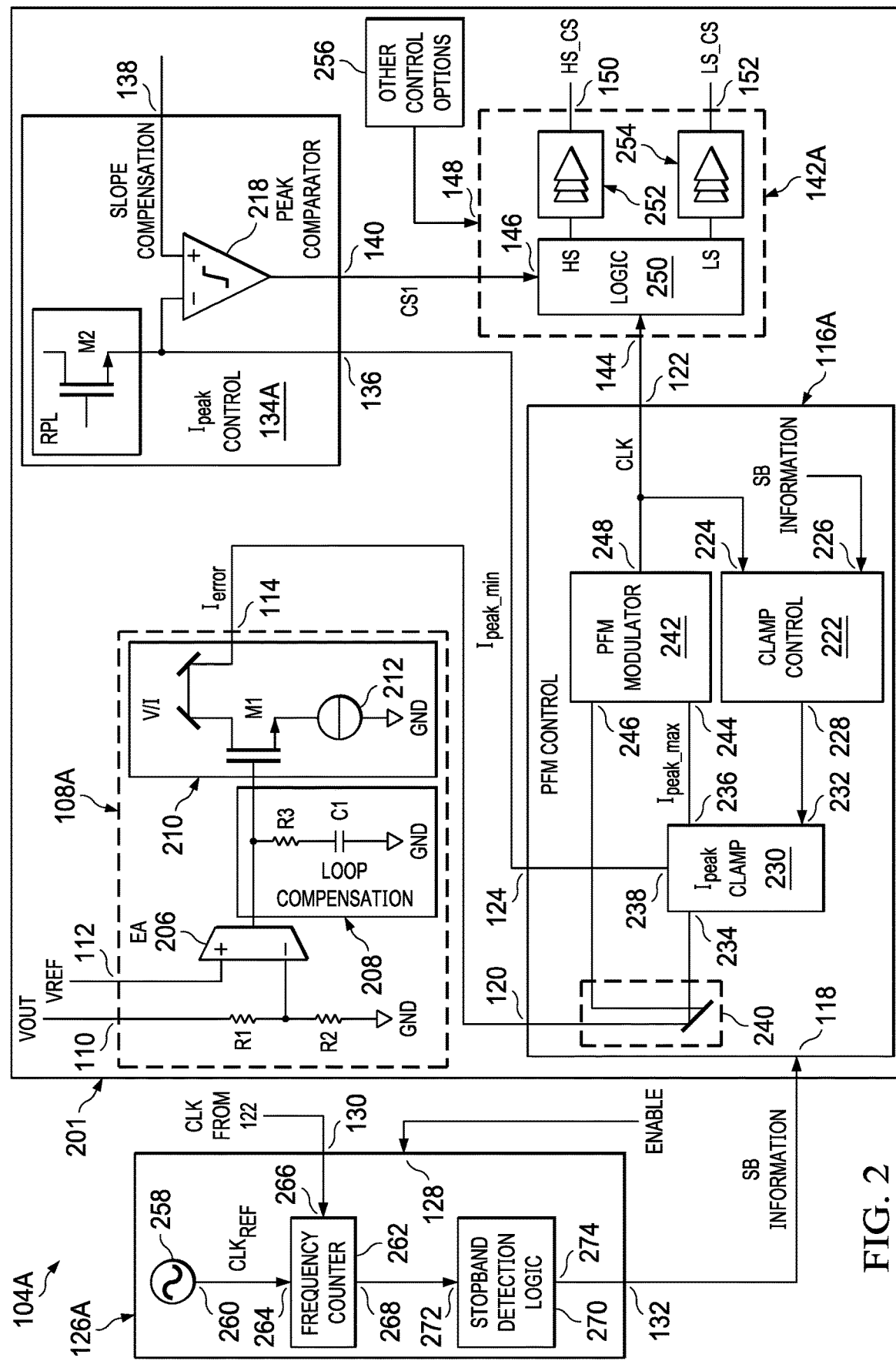
FIG. 2 is a diagram of a switching converter controller in accordance with an example embodiment.

FIG. 2 is a diagram of a switching converter controller 104A (an example of the switching converter controller 104 in FIG. 1) in accordance with an example embodiment. In FIG. 2, the switching converter controller 104A includes analog circuitry 201 and a stopband controller 126A (an example of the stopband controller 126 in FIG. 1) with digital circuitry. As shown, the stopband controller 126A includes an oscillator 258, a frequency counter 262, and stopband detection logic 270. More specifically, the oscillator 258 has an oscillator output 260, which outputs a reference clock signal ($CLK_{REF}$). The stopband controller 126A also includes a frequency counter 262 having: a first frequency counter input 264, a second frequency counter input 266, and a frequency counter output 268. The first frequency counter input 264 is coupled to the oscillator output 260 and is configured to receive $CLK_{REF}$. The second frequency counter input 266 is coupled to a second stopband controller input 130 and is configured to receive CLK from the first PFM controller output 122. In some example embodiments, $CLK_{REF}$ has a higher frequency than CLK. In operation, the frequency counter 262 is configured to count the number of periods of $CLK_{REF}$ (the period of $CLK_{REF}$ being known) that fit into one period of CLK to determine a frequency value for CLK. The frequency value is output from the frequency counter output 268 to a stopband detection logic input 272 of the stopband detection logic 270.

In some example embodiments, the stopband detection logic 270 includes stopband detection logic output 274 coupled to the stopband controller output 132. In operation, the stopband detection logic 270 is configured to provide stopband information at the stopband detection logic output 274 responsive to a comparison of the frequency value (received from frequency counter 262) with a predetermined stopband. The stopband information indicates when the frequency value is within the predetermined stopband. In some example embodiments, the stopband controller 126A is configured to provide the stopband information to the stopband controller output 132 responsive to determining that a switching frequency of the switching converter controller is within a predetermined stopband for multiple stopband detection cycles. In some example embodiments, the stopband controller 126A is configured to: determine whether a switching frequency of the switching converter controller is within a predetermined stopband; and responsive to determining that the switching frequency of the switching converter controller is within the predetermined stopband, provide a stopband detected signal (e.g., the stopband information includes the stopband detected signal) to the stopband controller output 132 and delay stopband detection operations for a time interval. In some example embodiments, the stopband controller 126A is configured to: store a programmable number of predetermined stopbands; compare a frequency value determined from the reference signal to the programmable number of predetermined stopbands; and output a stopband detected signal to the stopband controller output 132 responsive to the frequency value being within one of the programmable number of predetermined stopbands.

In some example embodiments, the stopband controller 126A is configured to: store a programmable stopband size for each of the programmable number of predetermined stopbands; and output a stopband detected signal and a respective stopband size (e.g., the stopband information includes the stopband detected signal and the respective stopband size) to the stopband controller output 132 responsive to the frequency value being within one of the programmable number of predetermined stopbands.

In the example of FIG. 2, the analog circuitry 201 includes: a feedback error circuit 108A (an example of the feedback error circuit 108 in FIG. 1); a PFM controller 116A (an example of the PFM controller 116 in FIG. 1); a peak current controller 134A (an example of the peak current controller 134 in FIG. 1); and a driver circuit 142A (an example of the driver circuit 142 in FIG. 1. The feedback error circuit 108A includes the first feedback error circuit input 110, the second feedback error circuit input 112, and the feedback error circuit output 114. The first feedback error circuit input 110 is configured to receive VOUT (e.g., from a power stage output such as the power stage output 162). The second feedback error circuit input 112 is configured to receive VREF. In operation, the feedback error circuit 108A is configured to output a feedback error signal (e.g., $I_{error}$ or part of $I_{error}$) to the feedback error circuit output 114 responsive to VOUT and VREF.

In some example embodiments, the feedback error circuit 108A includes an error amplifier 106 having a non-inverting (+) input, an inverting (−) input, and an output. In the example of FIG. 2, the non-inverting input of the error amplifier 206 is coupled to the second feedback error circuit input 112. The inverting input of the error amplifier 106 is coupled the first feedback error circuit input 110 via a voltage divider that includes resistors R1 and R2. With R1 and R2, the inverting input of the error amplifier 208 receives a scaled version of VOUT.

In the example of FIG. 2, the output of the error amplifier 206 is coupled to loop compensation circuitry 208 and a voltage-to-current converter 210. The loop compensation circuitry 208 is coupled between the output of the error amplifier 206 and ground. In the example of FIG. 2, the loop compensation circuitry 208 includes a third resistor (R3) and a first capacitor (C1) in series. In other example embodiments, the loop compensation circuitry 208 varies. As shown, the voltage-to-current converter 210 includes a transistor (M1) having a control terminal coupled to the output of the error amplifier 206. A first current terminal of M1 is coupled to the feedback error circuit output 114 via a current mirror. A second current terminal of M1 is coupled to a first side of a current source 212. The second side of the current source 212 is coupled to ground. In some example embodiments, a feedforward signal (not shown) may be applied to the feedback error at the feedback error circuit output 114. When used, the feedforward signal helps account for fast changes to VIN and/or VOUT.

In the example of FIG. 2, the PFM controller 116A includes the first PFM controller input 118, the second PFM controller input 120, the first PFM controller output 122, and the second PFM controller output 124. The first PFM controller input 118 is coupled to the stopband controller output 132 and is configured to receive stopband information (e.g., a stopband detected signal, stopband size, stopband response instructions) as appropriate. The second PFM controller input 120 is coupled to the feedback error circuit output 114. The first PFM controller output 122 is coupled to: the first driver input 144 of the driver circuit 142; and a clamp controller 222. The second PFM controller output 124 is coupled to the peak current controller input 136. In some example embodiments, the PFM controller 116A is configured to provide a minimum peak current ($I_{peak\_min}$) to the second PFM controller output 124.

In some example embodiments, the PFM controller 116A includes a PFM modulator 242. The PFM modulator 242 includes a first PFM modulator input 244, a second PFM modulator input 246, and a PFM modulator output 248. In the example of FIG. 2, the first PFM modulator input 244 is coupled to a peak current clamp 230. The second PFM modulator input 246 is coupled to the feedback error circuit output 114 via a current mirror 240. In other words, the first PFM modulator input 244 receives a reference signal, while the second PFM modulator input 246 receives a feedback error signal ($I_{error}$ or a scaled version of $I_{error}$). In some example embodiments, the reference signal is a maximum peak current ($I_{peak\_max}$) provided by the peak current clamp 230. In some example embodiments, the PFM modulator 242 is configured to adjust a frequency of CLK at the PFM modulator output 248 responsive to the reference signal and feedback error, where the reference signal may vary to account for stopband detection. If the feedback error is greater than a threshold, the PFM modulator 242 may be configured to maintain the frequency of CLK regardless of stopband detection. In such case, the peak current controller 134A is configured to perform peak current modulation while the frequency of CLK is clamped to a fixed value.

In the example of FIG. 2, the peak current controller 134A includes a comparator 218 having: an inverting (−) input coupled to the first peak current controller input 136; and a non-inverting (+) input to the second peak current controller input 138. The inverting input of the comparator 218 is also coupled to a transistor (M2). In some example embodiments, M2 is a replica of a high-side power transistor of a power stage (i.e., M2 is a replica of one of the switch(es) 168 the power stage 154 in FIG. 1). M2 may be scaled relative to the high-side power transistor based on a replica ratio. The non-inverting input of the comparator 218 is coupled to the switch node of the high-side power transistor. Thus, the voltage at the second peak current controller input 138 is the drop across the high-side power transistor, which is directly proportional to the current in the inductor. Current flowing through M2 via the first peak current controller input 136 is defined by a control loop (e.g., the control loop 106 in FIG. 1), which acts as a reference for the inductor current. When the inductor current is equal to the current through M2 times a replica factor, the voltage at the inverting and non-inverting inputs of the comparator 218 are the same.

During switching converter operations, the logic 250 of the driver circuit 142A turns on the high-side power transistor at the rising edge of CLK. When the high-side power transistor turns on, the inductor current rises and as a result, the voltage at the second peak current controller input 138 rises. When voltage at the second peak current controller input 138 crosses the voltage at the first peak current controller input 136, the comparator 218 asserts CS1 at the peak current controller output 140. Responsive to CS1 being asserted, the logic 250 turns off the high-side power transistor and turns on the low-side power transistor. In operation, the peak current controller 134A is configured to perform peak current modulation response to $I_{peak\_min}$ received at the first peak current controller input 136, a slope compensation signal received at the second peak current controller input 138, and the operations of M2. The peak current modulation operations result in CS1 being selectively asserted at the peak current controller output 140. As shown, the peak current controller output 140 is coupled to the second driver circuit input 146 of the driver circuit 142A.

In the example of FIG. 2, $I_{peak\_min}$ is controlled by the peak current clamp 230, which includes a first peak current clamp input 232, a second peak current clamp input 234, a first peak current clamp output 236, and a second peak current clamp output 238. The first peak current clamp input 232 is coupled to a clamp controller output 228 of a clamp controller 222. As shown, the clamp controller 222 also includes: a first clamp controller input 224 coupled to the PFM modulator output 248; and a second clamp controller input 226 coupled to the first PFM controller input 118 (to receive stopband information). In operation, the clamp controller 222 is configured to provide a clamp control signal at the clamp control output 228 responsive to the stopband information and/or CLK. As shown, the second peak current clamp input 234 of the peak current clamp 230 is coupled to the feedback error circuit output 114 via the current mirror 240. The first peak current clamp output is coupled to the first PFM modulator input 244. The second peak current clamp output 238 is coupled to the second PFM controller output 124. In some example embodiments, the peak current clamp 230 is configured to provide $I_{peak\_max}$ to the first peak current clamp input 236 and $I_{peak\_min}$ to the second peak current clamp output 238 responsive to a clamp control signal received at the peak current clamp input 232 and a feedback error received at the second peak current clamp input 234.

In the example of FIG. 2, the driver circuit 142A includes the first driver circuit input 144, the second driver circuit input 146, the first driver circuit output 150, and the second driver circuit output 152. In some example embodiments, the driver circuit 142A includes logic 250 coupled to the first driver circuit input 144, the second driver circuit input 146, and possibly the additional driver circuit inputs 148. The logic 250 is coupled to: a first drive circuit 252 having an output coupled to the first driver circuit output 250; and a second drive circuit 252 having an output coupled to the second driver circuit output 252. In operation, the driver circuit 142A is configured to provide drive signals (e.g., HS_CS and/or LS_CS) at the first driver circuit output 150 and the second driver circuit output 152 responsive to CLK received by the first driver circuit input 144, CS1 received by the second driver circuit input 146, and/or other control signals received by additional driver circuit inputs 148. The other control signals are provided by other control options 256, which may be included with the analog circuitry 201. Examples of the other control options 256 include PWM control, multi-phase control, zero crossing detection, and/or other control options.

In different example embodiments, the topology of a switching converter controller such as the switching converter controller 104 may vary. Regardless of the particular topology, a switching converter controller topology may include a stopband controller such as the stopband controller 126A to determine a switching frequency of the switching converter controller. If the switching frequency of the switching converter controller is within a predetermined stopband, the frequency of CLK provided to the driver circuit 142A may be selectively adjusted to avoid the stopband. In some example embodiments, adjusting the frequency of CLK involves adjusting a reference signal (e.g., a maximum peak current) used by a PFM modulator as described herein.

In some example embodiments, a first switching frequency (Fsw1) of a switching converter controller (e.g., the switching converter controller 104 in FIG. 1, or the switching converter controller 104A in FIG. 2) is given as:

$$Fsw1 = \frac{2 \times I_{load} \times Vout}{I_{peak1}^2 \cdot L}, \quad \text{(Equation 1)}$$

where $I_{load}$ is the output current to the load, VOUT is the output voltage to the load, $I_{peak1}$ is a first peak current for the power stage inductor (e.g., inductor 166), and L is the value of the power stage inductor. Meanwhile, a second switching frequency (Fsw2) of a switching converter controller (e.g., the switching converter controller 104 in FIG. 1, or the switching converter controller 104A in FIG. 2) is given as:

$$Fsw2 = \frac{2 \times I_{load} \times Vout}{I_{peak2}^2 \cdot L}, \quad \text{(Equation 2)}$$

where $I_{peak2}$ is a second peak current for the power stage inductor (e.g., inductor 166). In some example embodiments, avoiding stopbands is based on changing $I_{peak}$ as indicated in Equations 1 and 2, it can be seen that changing $I_{peak}$. As another option, the amount of change to $I_{peak}$ may be strategically controlled depending on stopband size, a stopband detection pattern, and/or other criteria.

Figure 3:
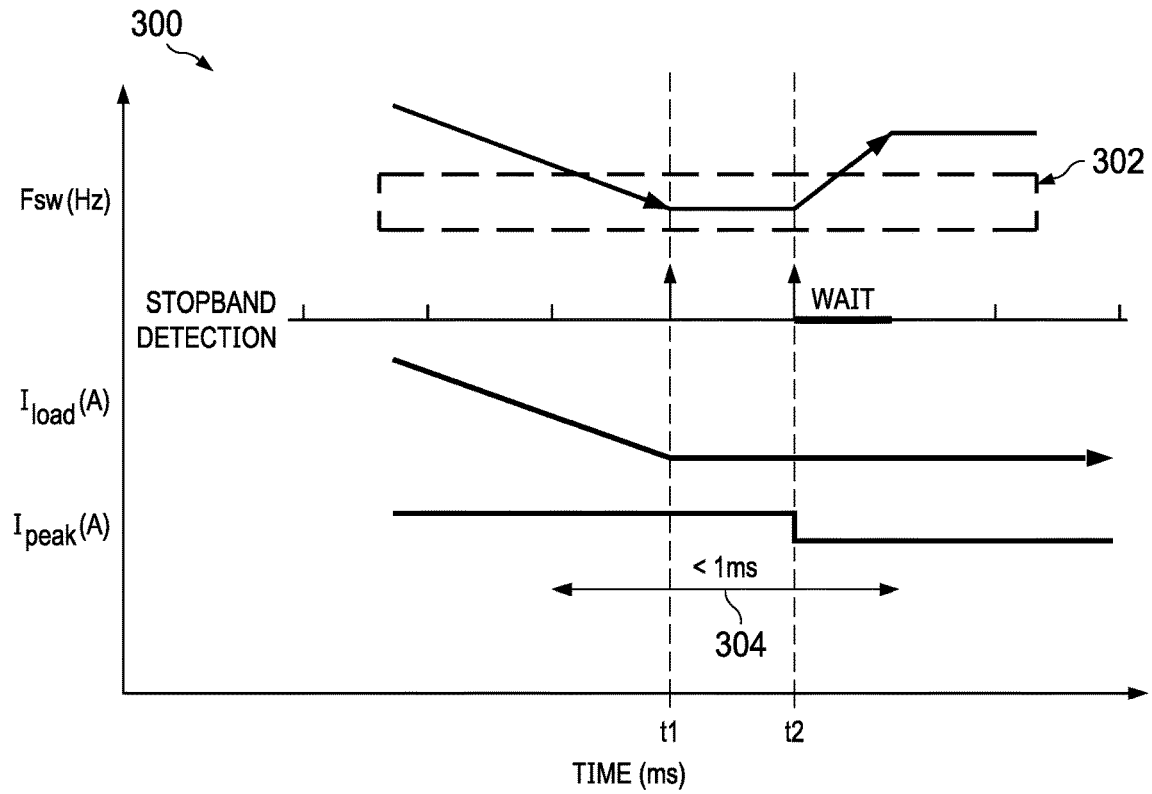
FIGS. 3-8 are graphs showing switching converter parameters as a function of time in accordance with example embodiments.

FIGS. 3-8 are graphs showing switching converter parameters as a function of time in accordance with example embodiments. In FIG. 3, graph 300 shows $I_{peak}$, $I_{load}$, and switching frequency (Fsw) as a function of time. Fsw is the switching frequency of the switching converter controller 104 in FIG. 1, the switching converter controller 104A in FIG. 2, or related power stage switches. Stopband detection cycles or samples are also represented in graph 300. As shown in graph 300, Fsw decreases as head decreases, resulting in Fsw eventually being detected within a predetermined stopband 302 at time t1. After a second detection of Fsw within the predetermined stopband 302 at time t2, $I_{peak}$ is decreased (e.g., the value of the reference signal used by the PFM modulator 242 is decreased), which results in an increase in Fsw. By adjusting $I_{peak}$ responsive to Fsw being detected within the predetermined stopband 302, Fsw can be moved away from the predetermined stopband 302 during scenarios in which $I_{load}$ decreases and settles.

In some example embodiments, stopband detection operations are paused or delayed after Fsw is detected as being within the predetermined stopband 302. Also, in different example embodiments, the number of stopband detection samples needed before a change in $I_{peak}$ is initiated may vary. With the decrease in $I_{peak}$, Fsw settles outside of the predetermined stopband 302. In graph 300, an interval 304 that includes t1 and t2 is shown, where the duration of the interval 304 is less than 1 ms.

Figure 4:
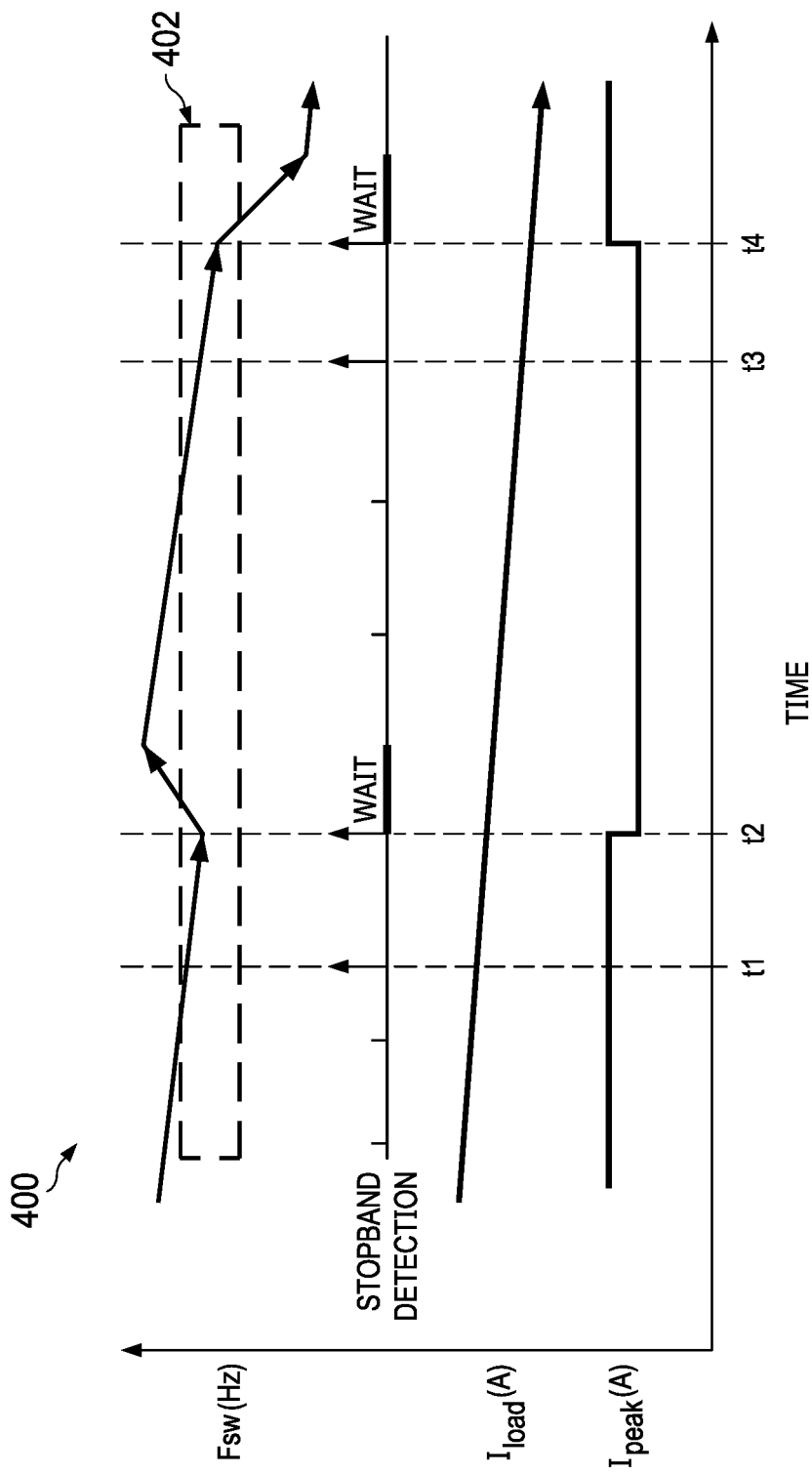

In FIG. 4, graph 400 shows $I_{peak}$, $I_{load}$, and Fsw as a function of time. Stopband detection cycles or samples are also represented in graph 400. As shown in graph 400, Fsw decreases as $I_{load}$ decreases, resulting in Fsw eventually being detected within a predetermined stopband 402 at time t1. After a second detection of Fsw within the predetermined stopband 402 at time t2, $I_{peak}$ is decreased (e.g., the value of the reference signal used by the PFM modulator 242 is decreased), which results in an increase in Fsw. In some example embodiments, stopband detection operations are paused or delayed after Fsw is detected as being within the predetermined stopband 402. Also, in different example embodiments, the number of stopband detection samples needed before a change in $I_{peak}$ is initiated may vary. After the increase in Fsw due to the decrease in $I_{peak}$, $I_{load}$ and Fsw continue to decrease. At times t3 and t4, Fsw is again detected as being within the predetermined stopband 402. In response, $I_{peak}$ is increased, which causes Fsw to decrease below the predetermined stopband 402. By adjusting $I_{peak}$ up or down responsive to Fsw being detected within the predetermined stopband 402, Fsw can be moved away from the predetermined stopband 402 during scenarios in which $I_{load}$ is decreasing.

Figure 5:
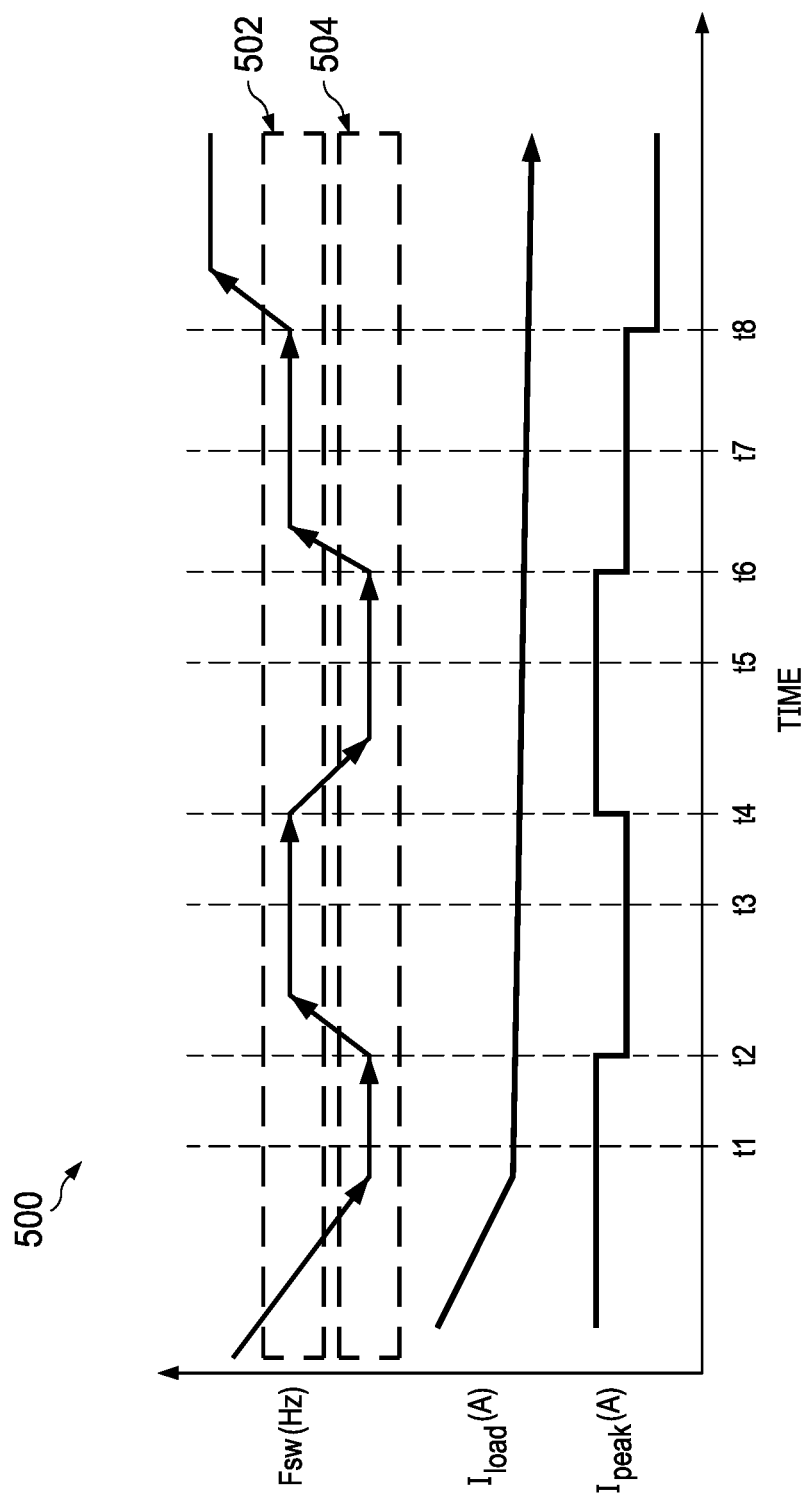

In FIG. 5, graph 500 shows $I_{peak}$, $I_{load}$, and Fsw as a function of time. As shown in graph 500, Fsw decreases as $I_{load}$ decreases, resulting in Fsw eventually being detected within a predetermined stopband 504 at time t1. After a second detection of Fsw within the predetermined stopband 504 at time t2, $I_{peak}$ is decreased (e.g., the value of the reference signal used by the PFM modulator 242 is decreased), which results in an increase in Fsw. In graph 500, the adjustment to $I_{peak}$ starting at time t2 results in Fsw being increased and detected within a predetermined stopband 502 at times t3 and t4. Responsive to the stopband detection at time t4, $I_{peak}$ is increased, which results in Fsw being decreased. At times t5 and t6, Fsw is detected as being within the predetermined stopband 504. Responsive to the stopband detection at time t6, $I_{peak}$ is decreased, which results in Fsw being increased. At times t7 and t8, Fsw is detected as being within the predetermined stopband 502. Responsive to the stopband detection at time t8, $I_{peak}$ is decreased again, which results in Fsw being increased and settling above the predetermined stopbands 502 and 504.

In some example embodiments, stopband detection operations are paused or delayed for a time after a change in $I_{peak}$ due to stopband detection (e.g., at times t2, t4, t6, and t8 in FIG. 5). Also, in different example embodiments, the number of stopband detection samples needed before a change in $I_{peak}$ is initiated may vary. As another option, the number of predetermined stopbands may vary. With graph 500, $I_{peak}$ is adjusted up or down as needed responsive to stopband detections to move Fsw out of the predetermined stopbands 502 and 504 during scenarios in which $I_{load}$ decreases and settles.

Figure 6:
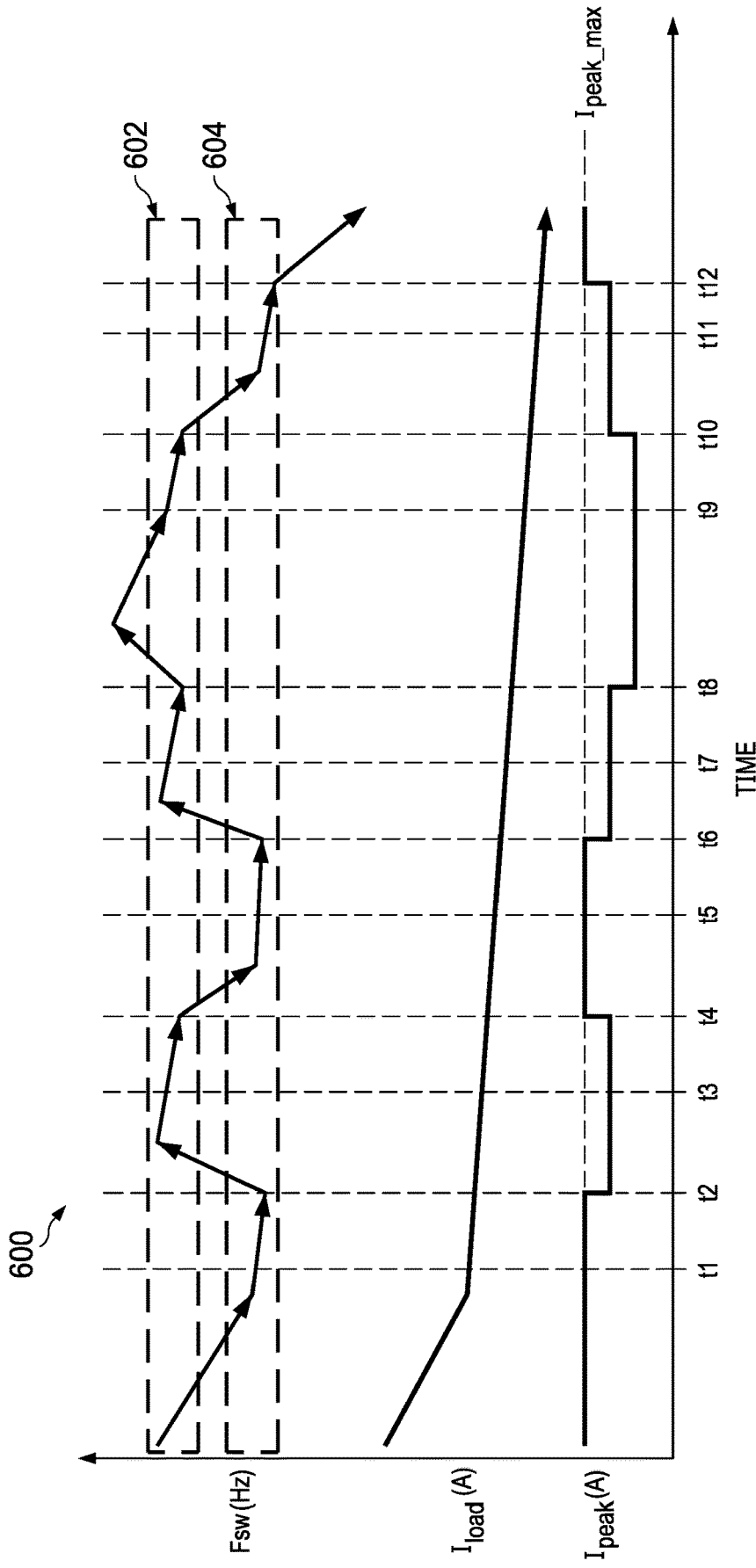

In FIG. 6, graph 600 shows $I_{peak}$, $I_{load}$, and Fsw as a function of time. As shown in graph 600, Fsw decreases as $I_{load}$ decreases, resulting in Fsw eventually being detected within a predetermined stopband 604 at times t1 and t2. Responsive to the stopband detection at times t1 and t2, $I_{peak}$ is decreased from a maximum peak current ($I_{peak\_max}$), which results in Fsw being increased. At times t3 and t4, Fsw is detected as being within a predetermined stopband 602. Responsive to the stopband detection at times t3 and t4, $I_{peak}$ is increased to $I_{peak\_max}$, which results in Fsw being decreased. At times t5 and t6, Fsw is detected as being within a predetermined stopband 604. Responsive to the stopband detection at times t5 and t6, $I_{peak}$ is decreased from $I_{peak\_max}$ again, which results in Fsw being increased. At times t7 and t8, Fsw is detected as being within the predetermined stopband 602. Responsive to the stopband detection at times t7 and t8, $I_{peak}$ is decreased again, which results in Fsw being increased above of the predetermined stopband 602. However, due to $I_{load}$ decreasing, Fsw decreases and is detected as being within the predetermined stopband 602 at times t9 and t10. Responsive to the stopband detection at times t9 and t10, $I_{peak}$ is increased, which results in Fsw being decreased. At times t11 and t12, Fsw is detected as being within the predetermined stopband 604. Responsive to the stopband detection at times t11 and t12, $I_{peak}$ is increased to $I_{peak\_max}$, which results in Fsw being decreased out of the predetermined stopband 604.

In some example embodiments, $I_{peak\_max}$ is selected based on a target efficiency and target VOUT ripple for a switching converter controller. In the example of FIG. 6, $I_{peak}$ adjustments do not go above $I_{peak\_max}$. In some example embodiments, stopband detection operations are paused or delayed for a time after a change in $I_{peak}$ due to stopband detection (e.g., at times t2, t4, t6, t8, t10, and t12 in FIG. 6). Also, in different example embodiments, the number of stopband detection samples needed before a change in $I_{peak}$ is initiated may vary. As another option, the number of predetermined stopbands may vary. With graph 600, $I_{peak}$ is adjusted up or down as needed responsive to stopband detections to move Fsw out of the predetermined stopbands 602 and 604 during scenarios in which $I_{load}$ is decreasing at different rates. Also, $I_{peak\_max}$ is accounted for (i.e., $I_{peak}$ does not go above $I_{peak\_max}$).

Figure 7:
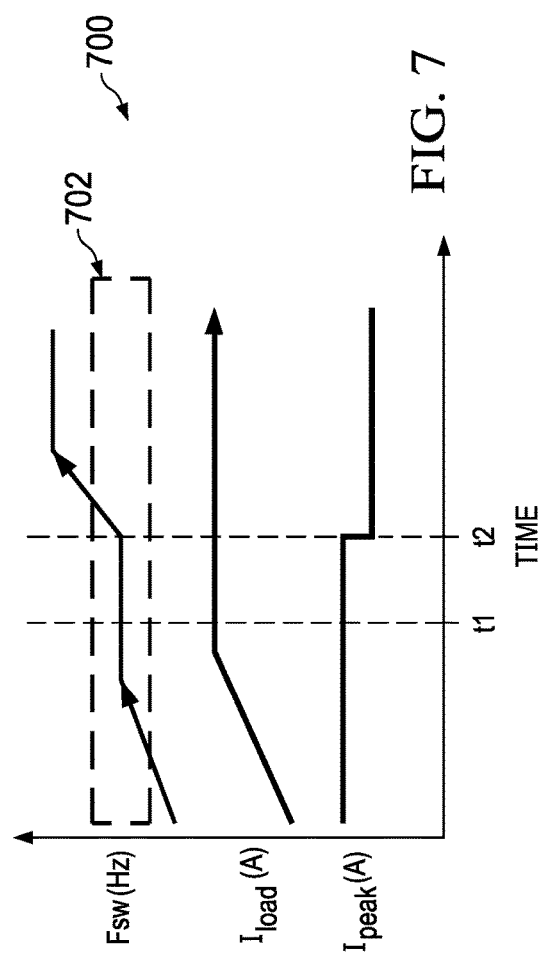

In FIG. 7, graph 700 shows $I_{peak}$, $I_{load}$, and Fsw as a function of time. As shown in graph 700, Fsw increases as $I_{load}$ increases, resulting in Fsw eventually being detected within a predetermined stopband 702 at times t1 and t2. Responsive to the stopband detection at times t1 and t2, $I_{peak}$ is decreased, which results in Fsw being increased and settling above the predetermined stopband 702. With graph 700, $I_{peak}$ is adjusted up or down as needed responsive to stopband detections to move Fsw out of the predetermined stopband 702 during scenarios in which head is increasing. In some example embodiments, stopband detection operations are paused or delayed for a time after a change in $I_{peak}$ due to stopband detection (e.g., at times t1 and t2 in FIG. 7). Also, in different example embodiments, the number of stopband detection samples needed before a change in $I_{peak}$ is initiated may vary. With graph 700, $I_{peak}$ is adjusted up or down as needed responsive to stopband detections to move Fsw out of the predetermined stopband 702 during scenarios in which $I_{load}$ is increasing.

Figure 8:
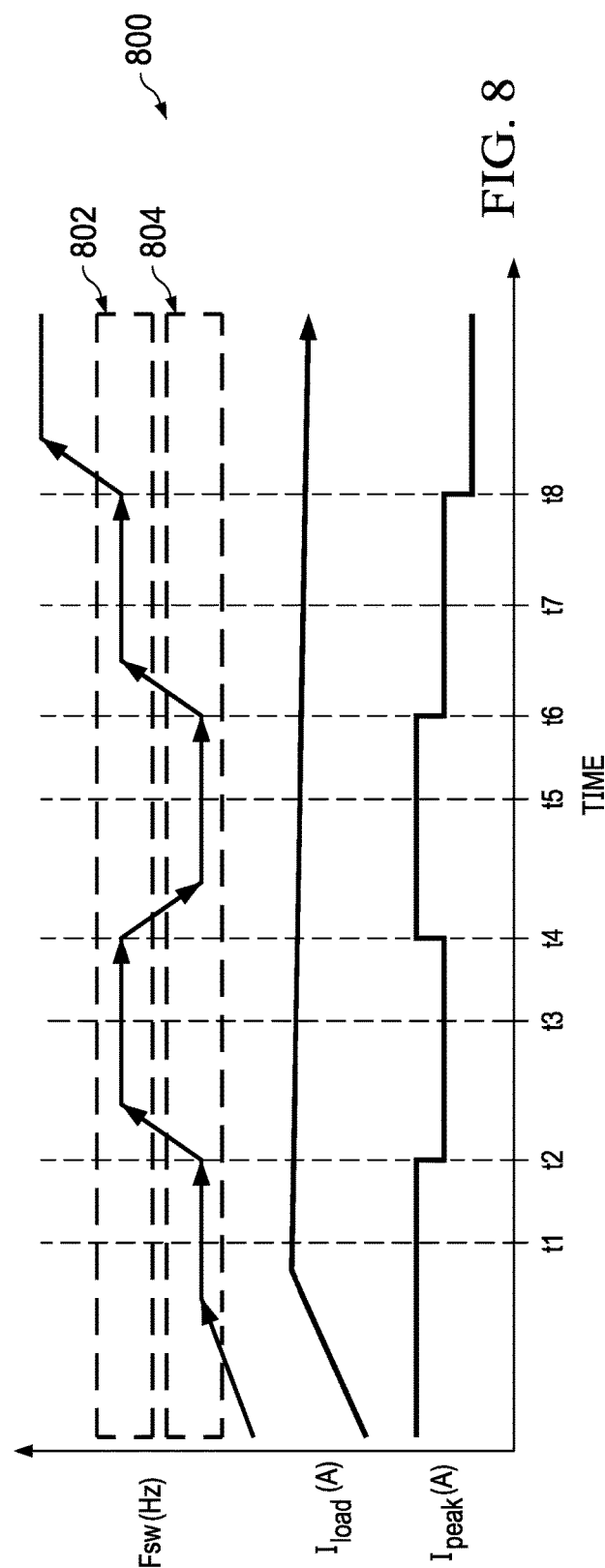

In FIG. 8, graph 800 shows $I_{peak}$, $I_{load}$, and Fsw as a function of time. As shown in graph 800, Fsw increases as $I_{load}$ increases, resulting in Fsw eventually being detected within a predetermined stopband 804 at times t1 and t2. Responsive to the stopband detection at times t1 and t2, $I_{peak}$ is decreased, which results in Fsw being increased. At times t3 and t4, Fsw is detected as being within a predetermined stopband 802. Responsive to the stopband detection at times t3 and t4, $I_{peak}$ is increased, which results in Fsw being decreased. At times t5 and t6, Fsw is detected as being within the predetermined stopband 804. Responsive to the stopband detection at times t5 and t6, $I_{peak}$ is decreased again, which results in Fsw being increased. At times t7 and t8, Fsw is detected as being within the predetermined stopband 802. Responsive to the stopband detection at times t7 and t8, $I_{peak}$ is decreased again, which results in Fsw being increased and settling above the predetermined stopband 802.

In some example embodiments, stopband detection operations are paused or delayed for a time after a change in $I_{peak}$ due to stopband detection (e.g., at times t2, t4, t6, and t8 in FIG. 8). Also, in different example embodiments, the number of stopband detection samples needed before a change in $I_{peak}$ is initiated may vary. As another option, the number of predetermined stopbands may vary. With graph 800, $I_{peak}$ is adjusted up or down as needed responsive to stopband detections to move Fsw out of the predetermined stopbands 802 and 804 during scenarios in which head increases and settles.

Figure 9:
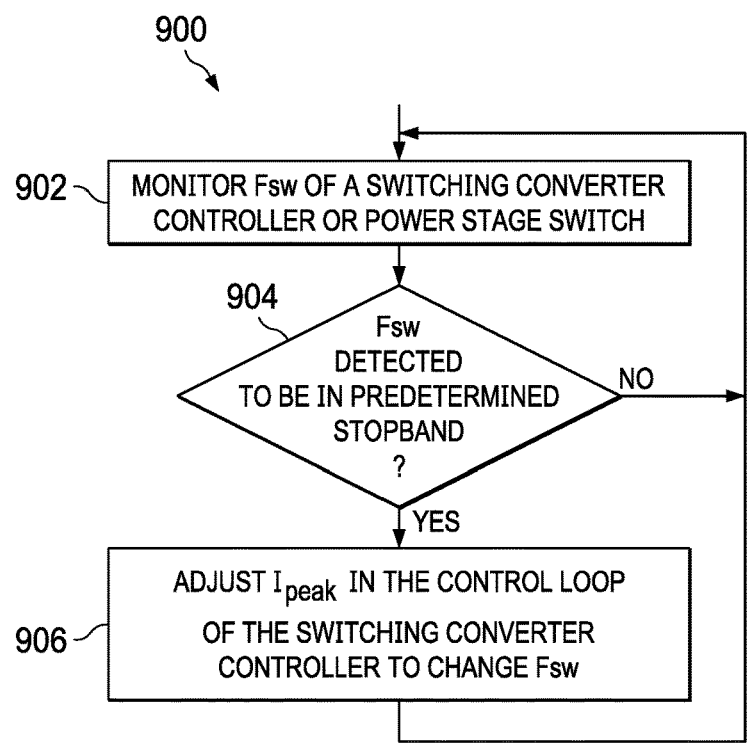
FIG. 9 is a flowchart showing a switching converter controller method in accordance with an example embodiment.

FIG. 9 is a flowchart showing a switching converter controller method 900 in accordance with an example embodiment. The method 900 is performed, for example, by the switching converter controller 104 in FIG. 1, or the switching converter controller 104A in FIG. 2. As shown, the method 900 includes monitoring Fsw of a switching converter controller or power stage switch at block 902. If Fsw is not detected to be within a predetermined stopband (determination block 904), the method 900 returns to block 902. If Fsw is detected to be within a predetermined stopband (determination block 904), $I_{peak}$ in the control loop (e.g., the control loop 106 in FIG. 1) is adjusted to change Fsw at block 906. For example, an increase to $I_{peak}$ will decrease Fsw while a decrease to $I_{peak}$ will increase Fsw. In some example embodiments, $I_{peak\_max}$ is accounted for by the switching converter controller, where $I_{peak\_max}$ is based on a target efficiency and/or target VOUT ripple for the switching converter controller. Other options include enabling/disabling stopband detection, selectively combining stopband avoidance with other control loop options (e.g., PWM control, peak/valley current control, voltage mode control, hysteretic control, constant ON/OFF time control, multi-phase control, zero crossing detection, and/or other control options), use of multiple programmable stopbands, use of programmable stopband sizes, changing the amount of change to $I_{peak}$ based on stopband size or stopband pattern detection, determining an appropriate frequency step size to avoid stopbands or move away from stopbands, and/or changing Fsw by the frequency step size as needed to avoid repeated stopband violations. In another example embodiments, the inductor peak current is adjusted up or down without clamping the maximum or minimum inductor peak currents and also no clamping for the maximum switching frequency.

Figure 10A:
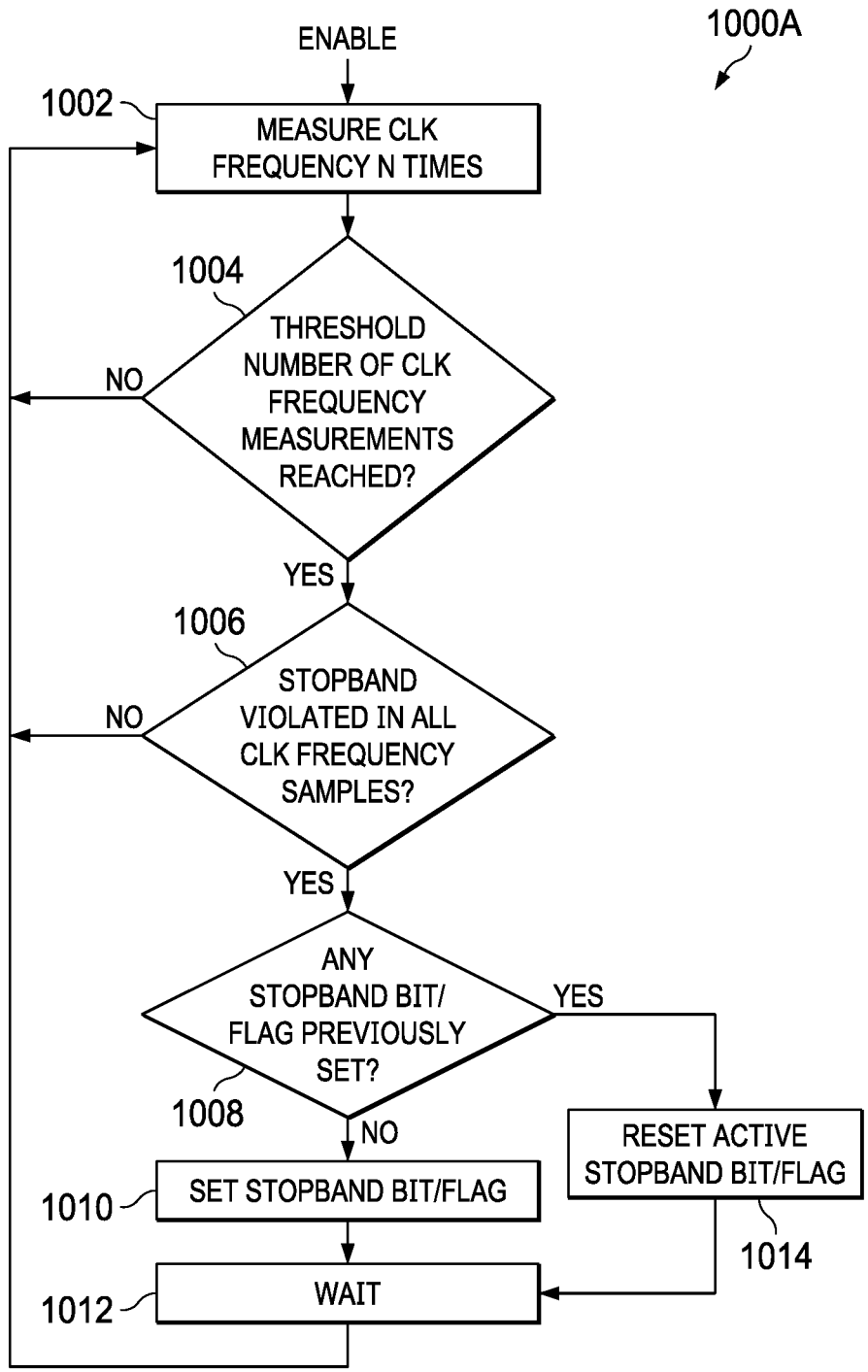
FIGS. 10A and 10B are flowcharts showing switching converter controller methods in accordance with example embodiments.
Figure 10B:
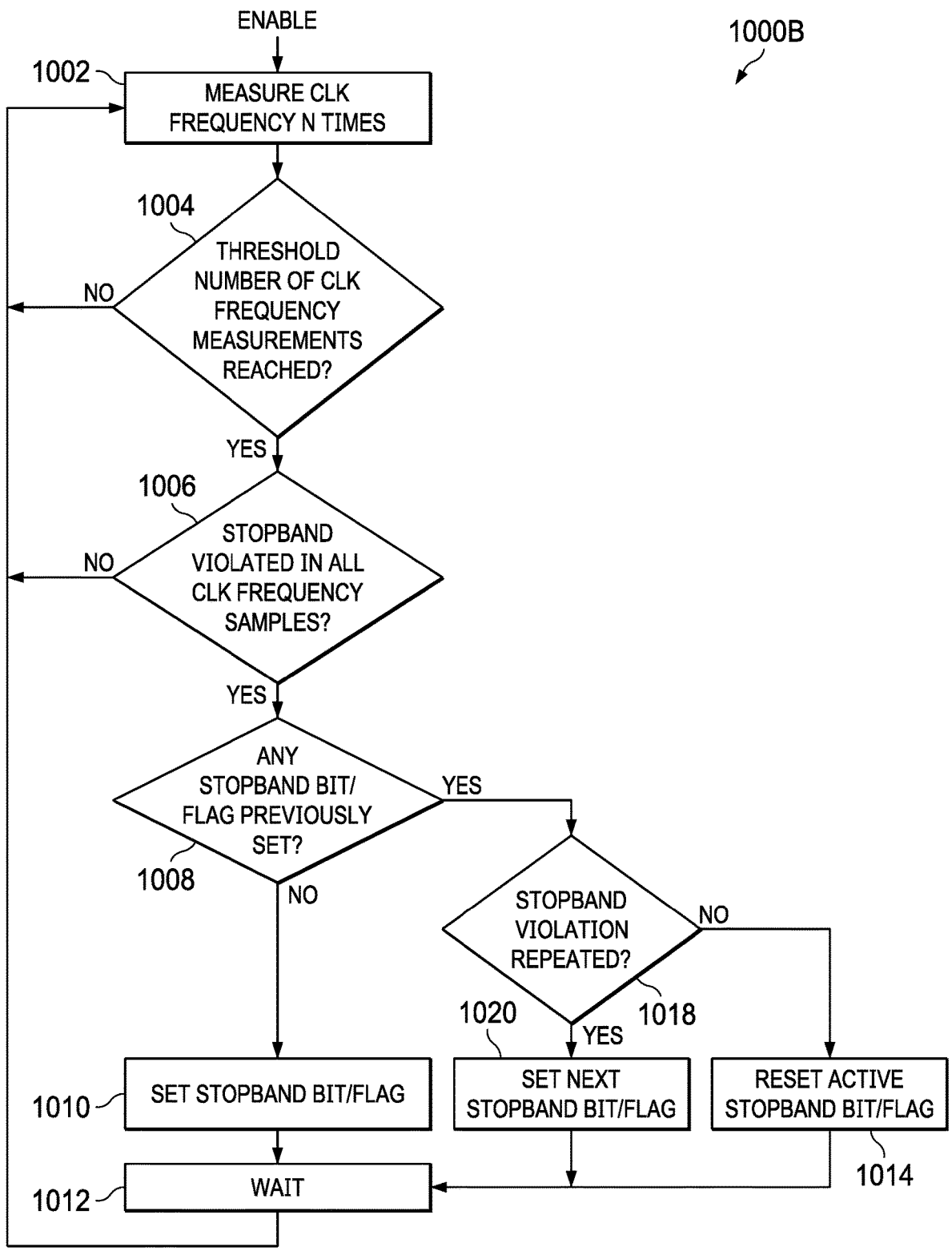

FIGS. 10A and 10B are flowcharts showing switching converter controller methods 1000A and 1000B in accordance with example embodiments. The methods 1000A and 1000B are performed, for example, by a state machine or digital logic of a stopband controller (e.g., the stopband controller 126 in FIG. 1, or the stopband controller 126A in FIG. 2). When enabled, the method 1000A of FIG. 10A includes measuring the frequency of CLK at block 1002. If a threshold number (fixed or programmable) of CLK frequency measurements is not reached (determination block 1004), the method 1000A returns to block 1002. If the threshold number of CLK frequency measurements is reached (determination block 1004), a determination is made regarding whether a stopband is violated in all of the CLK frequency samples (determination block 1006). If not, the method 1000A returns to block 1002. If a stopband is violated in all of the CLK frequency samples (determination block 1006), a determination is made regarding whether any stopband bit or flag was previously set (determination block 1008). If not, a stopband bit or flag is set at block 1010, and the method 1000A waits at block 1012 for a time interval (e.g., fixed or programmable) before returning to block 1002. If a stopband bit or flag was previously set (determination block 1008), an active stopband bit or flag is reset at block 1014. The method 1000A then waits at block 1012 for a time interval before returning to block 1002.

When enabled, the method 1000B of FIG. 10B includes the various blocks of the method 1000A of FIG. 10A as well as blocks 1018 and 1020 to avoid oscillating between adjacent stopbands. In method 1000B, if any stopband bit or flag was previously set (determination block 1008), a determination is made regarding whether a stopband violation is repeated (determination block 1018). If not, the method 1000B proceeds to blocks 1014 and 1012. If a stopband violation is repeated (determination block 1018), a next stopband bit or flag is set at block 1020. The method 1000B then waits at block 1012 for a time interval before returning to block 1002.

In some example embodiments, a switching converter controller is configured to selectively adjust its switching frequency to avoid one or more predetermined stopbands. In different example embodiments, the size and number of stopbands accounted for by the switching converter controller varies. In some example embodiments, the switching converter controller includes a control loop configured to selectively adjust a clock signal responsive to stopband information and feedback error, where the clock signal determines the switching frequency of the switching converter controller. For example, the clock signal may be provided to a driver circuit configured to generate drive signals for one or more power stage switches based on the clock signal. By controlling the switching frequency of the switching converter controller to avoid the one or more predetermined stopbands, switching noise at these predetermined stopbands is avoided or reduced. As desired, the described options for selectively adjusting the switching frequency of the switching converter controller to account for one or more predetermined stopbands can be combined with other switching converter controller options (e.g., pulse-width modulation (PWM) control, peak current control, multi-phase control, zero crossing detection, and/or other control options).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "electrode", "node", "interconnection", "pin", "contact", and "connection" are used interchangeably. Unless specifically stated to the contrary, these terms are generally used to mean an interconnection between or a terminus of a device element, a circuit element, an integrated circuit, a device or other electronics or semiconductor component.

The example embodiments above may utilize switches in the form of n-type metal-oxide semiconductor field-effect transistors (nMOSFET or just "nMOS") or pMOS transistors. Other example embodiments may utilize NPN bipolar junction transistors (BJTs), PNP BJTs, or any other type of transistor. Hence, when referring to a current electrode, such electrode may be an emitter, collector, source or drain. Also, the control electrode may be a base or a gate.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in this description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. A switching converter controller comprising:
   a stopband controller having:
     an oscillator configured to output a reference signal,
     a frequency counter configured to:
       receive the reference signal and a clock signal, and
       output a frequency value for the clock signal,
     a stopband controller input configured to receive the clock signal, and
     a stopband controller output, wherein:
       the stopband controller is configured to provide stopband information at the stopband controller output based on the frequency value for the clock signal; and
   a pulse-frequency modulation (PFM) controller having a first PFM controller input, a second PFM controller input and a PFM controller output, the second PFM controller input coupled to the stopband controller output, and the PFM controller configured to adjust the clock signal at the PFM controller output based on the stopband information.

2. The switching converter controller of claim 1, further comprising:
   a driver circuit having a driver circuit input and a driver circuit output, the driver circuit input coupled to the PFM controller output and configured to receive the clock signal, and the driver circuit output adapted to be coupled to a power stage switch.

3. The switching converter controller of claim 1, wherein:
   the stopband controller includes an enable input; and
   the stopband controller is configured to provide the stopband information at the stopband controller output in response to an enable signal received at the enable input.

4. The switching converter controller of claim 1, wherein:
   the first PFM controller input is configured to receive an error signal; and
   the PFM controller is configured to selectively adjust the clock signal at the PFM controller output based on the stopband information and the error signal.

5. The switching converter controller of claim 4, wherein:
   the error signal indicates a feedback error is equal to or less than a threshold; and
   the feedback error is based on a difference between an output voltage and a reference voltage.

6. The switching converter controller of claim 5, further comprising:
   a current peak controller having a first input, a second input, and an output;
   wherein:
     the first input is coupled to the PFM controller, the first input configured to receive a minimum peak current;
     the second input is configured to receive a ramp signal; and
     the current peak controller is configured to provide to a driver a peak current modulation signal on the output based on the minimum peak current and the ramp signal.

7. The switching converter controller of claim 6, wherein:
   the current peak controller is configured to provide the peak current modulation signal in response to the error signal indicating the feedback error is greater than the threshold.

8. The switching converter controller of claim 1, wherein:
   the stopband controller is configured to provide the stopband information responsive to a comparison of the reference signal with a stopband value; and the stopband information indicating the reference signal is within the stopband value.

9. The switching converter controller of claim 1, wherein:
the stopband controller is configured to provide the stopband information responsive to a comparison of the reference signal with a stopband value; and
the stopband information indicating the reference signal is within the stopband value for multiple stopband detection cycles.

10. The switching converter controller of claim 1, wherein:
the stopband controller is configured to provide the stopband information responsive to a comparison of the reference signal with a stopband value;
the stopband information indicating the reference signal is within the stopband value; and
in response to the reference signal being within the stopband value, the stopband controller is configured to delay stopband detection operations for a time interval.

11. The switching converter controller of claim 1, wherein:
the stopband information includes a detection signal and a stopband size.

12. The switching converter controller of claim 1, wherein:
the stopband controller is configured to store a stopband; and
the stopband controller is configured to store a stopband size for the stopband.

13. The switching converter controller of claim 12, wherein:
the PFM controller is configured to adjust the clock signal to avoid the stopband.

14. The switching converter controller of claim 12, wherein:
the PFM controller is configured to adjust the clock signal above the stopband.

15. The switching converter controller of claim 12, wherein:
the PFM controller is configured to adjust the clock signal below the stopband.

16. The switching converter controller of claim 1, wherein:
the PFM controller includes a clamp controller; and
the clamp controller is configured to provide a clamp control signal responsive to the stopband information.

\* \* \* \* \*